US012346615B2

(12) United States Patent
Fujisawa

(10) Patent No.: US 12,346,615 B2
(45) Date of Patent: Jul. 1, 2025

(54) PRINTING APPARATUS, CONTROL METHOD, AND STORAGE MEDIUM

(71) Applicant: CANON KABUSHIKI KAISHA, Tokyo (JP)

(72) Inventor: Minoru Fujisawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/437,125

(22) Filed: Feb. 8, 2024

(65) Prior Publication Data

US 2024/0272840 A1    Aug. 15, 2024

(30) Foreign Application Priority Data

Feb. 13, 2023    (JP) ................. 2023-019680

(51) Int. Cl.
*G06F 3/12*    (2006.01)

(52) U.S. Cl.
CPC .......... *G06F 3/1217* (2013.01); *G06F 3/1218* (2013.01); *G06F 3/1232* (2013.01); *G06F 3/1287* (2013.01)

(58) Field of Classification Search
CPC .... G06F 3/1217; G06F 3/1218; G06F 3/1232; G06F 3/1287
USPC ....................................... 358/1.15
See application file for complete search history.

(56) References Cited

U.S. PATENT DOCUMENTS 8,203,734 B2*    6/2012    Kadota ................. G06F 3/1285
                                                  358/1.15
10,609,036 B1*   3/2020    Allen ..................... G06Q 50/01
2022/0179603 A1* 6/2022    Sako ..................... G06F 3/1276

FOREIGN PATENT DOCUMENTS

JP    2012133489 A    7/2012
JP    2021172072 A    11/2021
JP    2022089143 A    6/2022

* cited by examiner

*Primary Examiner* — Allen H Nguyen
(74) *Attorney, Agent, or Firm* — Canon U.S.A., Inc. IP Division

(57) ABSTRACT

A control method of a printing apparatus in communication with a print service via an Internet, the control method includes receiving storage information for storing icon image data on the printing apparatus from the print service, storing the icon image data on the printing apparatus based on the storage information, and in a case where the print service is notified of capability information about the printing apparatus, notifying the print service of the capability information with path information about the stored icon image data on the printing apparatus included, wherein in a case where an event to store the icon image data occurs, the storage information is received and the icon image data on the printing apparatus is stored, and then the notifying notifies the print service of the capability information with the path information about the stored icon image data on the printing apparatus included.

10 Claims, 18 Drawing Sheets

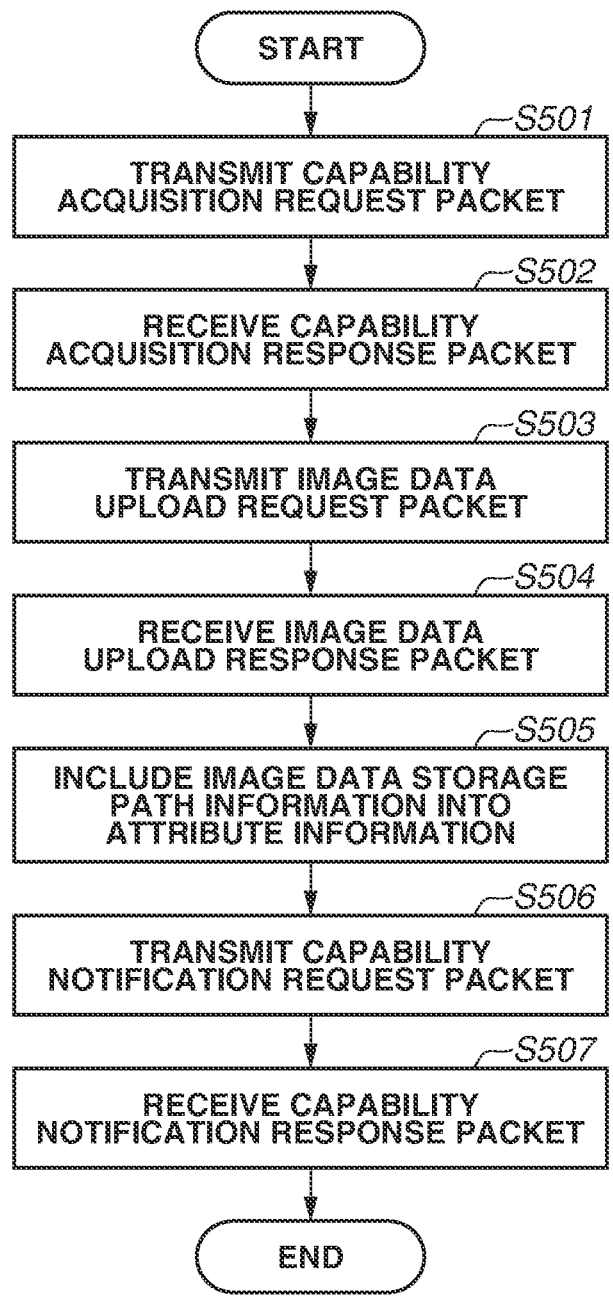

FIG.6A

```
REGISTRATION REQUEST PACKET

Operation : Register-Output-Device Request
Requested-attributes :
  manufacture = "Canon"
  model = "iR-ADV"
```

FIG.6B

```
REGISTRATION RESPONSE PACKET

Operation : Register-Output-Device Response
Status code : successful-ok
Attribute:
  Cloud-device-id="0cc23168-d681-49b4-bc22-ef704a024aff"
```

FIG.7A

CAPABILITY ACQUISITION REQUEST PACKET

Operation : Get-Printer-Attributes Request
Requested-attributes :
  printer-static-resource-directory-uri

FIG.7B

CAPABILITY ACQUISITION RESPONSE PACKET
Operation : Get-Printer-Attributes Response
Status code : successful-ok
Attribute:
  printer-static-resource-directory-uri = "https://print.microsoft.com/static-resource/0cc23168-d681-49b4-bc22-ef704a024aff"

FIG.8A

```
IMAGE DATA UPLOAD REQUEST PACKET

Protocol : HTTP
PUT /Printer-icon.png  HTTP/1.1
Host : https://print.microsoft.com/static-resource/0cc23168-d681-49b4-bc22-
ef704a024aff
Content-type : png
Content-length : 100

< Image data >
```

FIG.8B

```
IMAGE DATA UPLOAD RESPONSE PACKET
Protocol : HTTP
HTTP/1.1  201 Created
Content-Location : /Printer-icon.png
```

FIG.9A

CAPABILITY NOTIFICATION REQUEST PACKET
(WITH IMAGE DATA STORAGE PATH INFORMATION INCLUDED)

Operation : Update-Output-Device-Attributes Request
Requested-attributes :
   printer-state = idle
   printer-state-reacons = none
   copies-supported = 1 ~ 999
   document-format-supported = pdf, jpeg
   printer-icons = "https://print.microsoft.com/static-resource/0cc23168-d681-49b4-bc22-ef704a024aff/Printer-icon.png"

FIG.9B

CAPABILITY NOTIFICATION RESPONSE PACKET

Operation : Update-Output-Device-Attributes Response
Status code : successful-ok

FIG.9C

CAPABILITY NOTIFICATION REQUEST PACKET
(WITHOUT IMAGE DATA STORAGE PATH INFORMATION INCLUDED)

Operation : Update-Output-Device-Attributes Request
Requested-attributes :
   printer-state = idle
   printer-state-reacons = none
   copies-supported = 1 ~ 999
   document-format-supported = pdf, jpeg

FIG.10A

```
CAPABILITY ACQUISITION REQUEST PACKET

Operation : Get-Printer-Attributes Request
Requested-attributes :
   printer-icons
   document-format-supported
   copies-supported
   printer-state
   printer-state-reasons
```

FIG.10B

```
CAPABILITY ACQUISITION RESPONSE PACKET

Operation : Get-Printer-Attributes Response
Status code : successful-ok
Attribute:
  printer-icons = "https://print.microsoft.com/static-resource/0cc23168-d681-
49b4-bc22-ef704a024aff/Printer-icon.png"
  document-format-supported = pdf, jpeg
  copies-supported = 1 ~ 999
  printer-state = idle
  printer-state-reasons = none
```

FIG.11A

```
IMAGE DATA ACQUISITION REQUEST PACKET

Protocol : HTTP
GET /Printer-icon.png  HTTP/1.1
Host : https://print.microsoft.com/static-resource/0cc23168-d681-49b4-bc22-
ef704a024aff
```

FIG.11B

```
IMAGE DATA ACQUISITION RESPONSE PACKET

Protocol : HTTP
HTTP/1.1  200 ok

< image data >
```

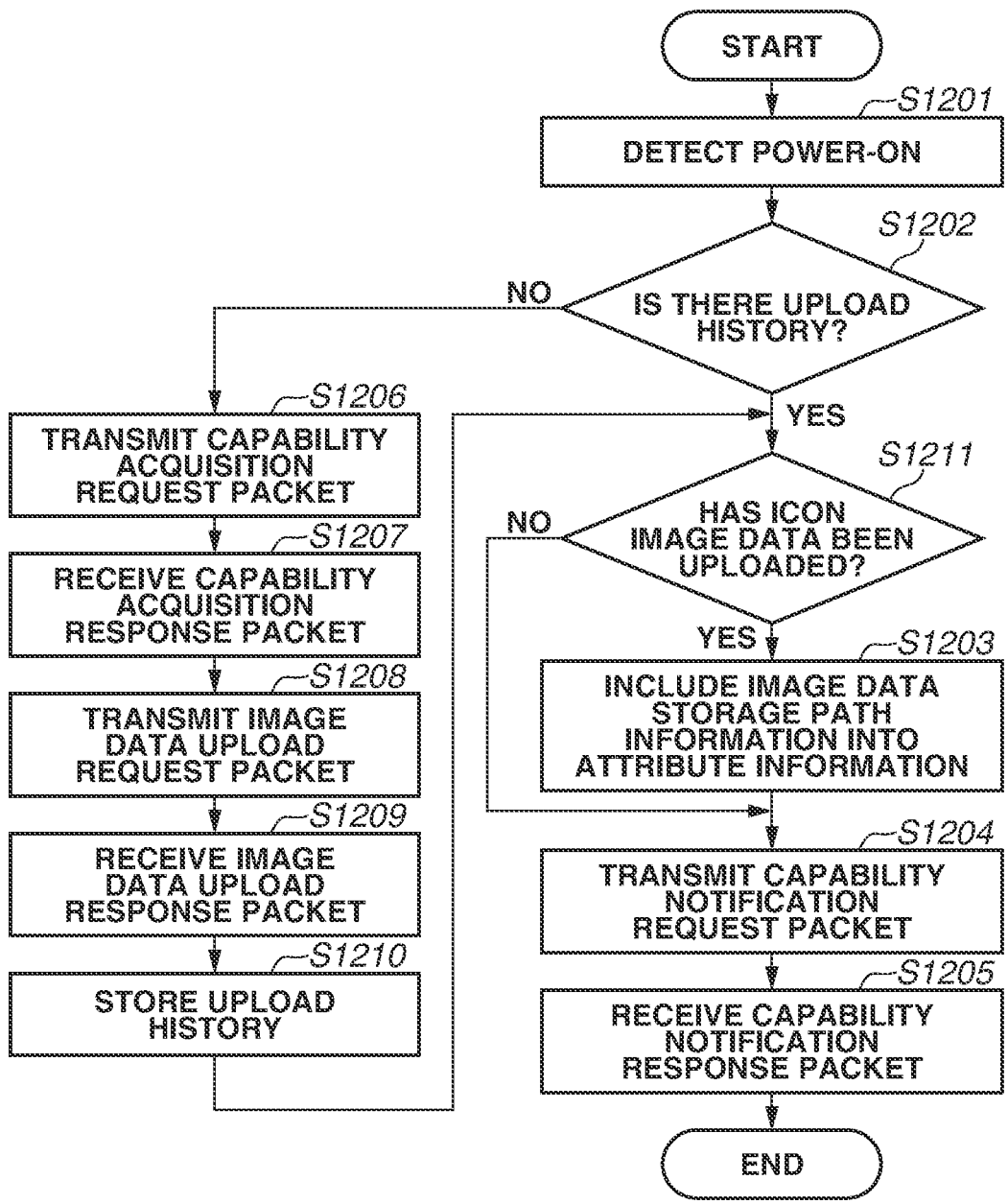

FIG.13A

UPLOAD HISTORY (SINGLE FILE)

https://print.microsoft.com/static-resouce/0cc23168-d681-49b4-bc22-ef704a024aff/Printer-icon.png

FIG.13B

UPLOAD HISTORY (PLURALITY OF FILES)

https://print.microsoft.com/static-resouce/0cc23168-d681-49b4-bc22-ef704a024aff/Printer-icon-small.png
https://print.microsoft.com/static-resouce/0cc23168-d681-49b4-bc22-ef704a024aff/Printer-icon-mid.png
https://print.microsoft.com/static-resouce/0cc23168-d681-49b4-bc22-ef704a024aff/Printer-icon-large.png

FIG.15A

```
IMAGE DATA DELETE REQUEST PACKET

Protocol : HTTP
DELETE /Printer-icon.png  HTTP/1.1
Host : https://print.microsoft.com/static-resouce/0cc23168-d681-49b4-bc22-
ef704a024aff
```

FIG.15B

```
IMAGE DATA DELETE RESPONSE PACKET

Protocol : HTTP
HTTP/1.1  200 ok

< image data >
```

FIG.17A

CLOUD PRINT SERVICE SETTING

| | |
|---|---|
| USE CLOUD PRINT SERVICE: | ON |
| PRINTER NAME: | CANON_PRINTER |
| APPLICATION ID: | XXXXXXX |
| AUTHENTICATION SERVER URL: | XXXXXXX |
| PRINTER REGISTRATION URL: | XXXXXXX |
| PRINTER REGISTRATION STATUS: | REGISTERED  *1701* |

[REGISTER/DEREGISTER PRINTER] [UPDATE PRINTER ICON]

FIG.17B

CLOUD PRINT SERVICE SETTING

☑ ICON 1    [ICON IMAGE 1] *1702*

☑ ICON 2    [ICON IMAGE 2] *1703*

☐ ICON 3    [ICON IMAGE 3] *1704*

*1705* [START UPDATE] [RETURN]

PRINTING APPARATUS, CONTROL METHOD, AND STORAGE MEDIUM

BACKGROUND

Field

The present disclosure relates to a printing apparatus that transmits image data to an external server, a control method, and a storage medium.

Description of the Related Art

Mechanisms for a cloud print service for submitting a print job via the cloud and transmitting the print job to a printing apparatus have started to become widespread in recent years (Japanese Patent Application Laid-Open No. 2012-133489). In such a printing system, the administrator initially registers the printing apparatus in a cloud print service (CPS; hereinafter, may be referred to as a print service) to which the administrator belongs. Users permitted to use the CPS then use their respective client terminals to select the printer registered in the CPS as an output printer, make desired print settings, and transmit a print job to the CPS. Receiving the print job, the CPS transfers the print job to the printing apparatus. The printing apparatus performs printing based on the transferred print job.

Such cloud printing mechanisms are defined in Printer Working Group (PWG) 5100.13, PWG 5100.18, Request for Comments (RFC) 3995, and RFC 3996, and a printing protocol called the Internet Printing Protocol (IPP) is defined. Such standards define a technique for the printing apparatus to acquire the Uniform Resource Locators (URLs) of the CPS and a storage server of printing apparatus's icon image data (icon data storage server) using the IPP. The printing apparatus uploads the icon image data on the printing apparatus to the URL-acquired icon data storage server, and notifies the CPS of URL path information about the location where the icon image data is stored. The client terminal acquires the URL path information from the CPS and acquires the icon image data from the icon data storage server. This facilitates the user to identify the printer (printing apparatus) in a printer search.

SUMMARY

According to an aspect of the present disclosure, a printing apparatus configured to communicate with a print service via an Internet, the print service being configured to register the printing apparatus based on acceptance of a registration request for the printing apparatus and provide the printing apparatus with a print job based on acceptance of a print instruction for the registered printing apparatus, includes at least one processor, and at least one memory in communication with the at least one processor having instructions stored thereon, when executed by the at least one processor, configured to function as a reception unit configured to receive storage information for storing icon image data on the printing apparatus from the print service, a storage unit configured to store the icon image data on the printing apparatus based on the storage information, and a notification unit configured to, in a case where the print service is notified of capability information about the printing apparatus, notify the print service of the capability information with path information about the stored icon image data on the printing apparatus included, wherein in a case where an event to store the icon image data occurs, the storage information is received and the icon image data on the printing apparatus is stored, and then the notification unit notifies the print service of the capability information with the path information about the stored icon image data on the printing apparatus included.

Further features of the present disclosure will become apparent from the following description of exemplary embodiments with reference to the attached drawings.

BRIEF DESCRIPTION OF THE DRAWINGS

FIG. 5 is a flowchart illustrating an example of control of the printing apparatus in using a cloud print service.

FIGS. 6A and 6B illustrate examples of packets for registering of the printing apparatus.

FIGS. 7A and 7B illustrate examples of packets for acquiring of capability information from the cloud print service.

FIGS. 8A and 8B illustrate examples of packets for uploading of icon image data.

FIGS. 9A to 9C illustrate examples of packets for capability notification to the cloud print service.

FIGS. 10A and 10B illustrate examples of packets for acquiring capability information about the printing apparatus registered in the cloud print service.

FIGS. 11A and 11B illustrate examples of packets for acquiring the icon image data.

FIG. 12 is a flowchart illustrating an example of control of the printing apparatus according to a first exemplary embodiment.

FIGS. 13A and 13B illustrate examples of an upload history of icon image data according to the first exemplary embodiment.

FIGS. 15A and 15B illustrate examples of packets communicated between the printing apparatus and an icon data storage server during delete processing of the icon image data.

FIGS. 17A and 17B illustrate an example of information update performed between the printing apparatus and the cloud print service (CPS).

DESCRIPTION OF THE EMBODIMENTS

Suppose that a printing apparatus in a power-off state where at least part of its hardware is not energized is powered on by a user instruction. The printing apparatus can issue a capability notification to a print service each time the printing apparatus is activated, since the statuses of the printing apparatus such as the remaining ink level and the remaining amount of sheets vary constantly. If the capability notification includes storage information about icon image data, the storage information is unnecessarily notified upon each activation.

The appearance of a printing apparatus and its icon can disagree with each other, for example, when the icon image data is changed to that of high image quality or in the event of a configuration change based on the functions of the printing apparatus like when a sheet feed stage is added or when a finishing function is added to sheet discharge operations. In such cases, the icon image data is desirably re-uploaded for update.

The icon image data can be large in size depending on the number of pieces of icon image data to be registered and the image quality.

Except for such cases, updating registered data with the same data imposes an unnecessary load on the network environment, delays the activation time of the printing apparatus due to extended upload completion time, and affects the convenience.

In view of such issues, an exemplary embodiment of the present disclosure is directed to providing a mechanism for preventing unnecessary upload of icon image data by a printing apparatus.

Exemplary embodiments of the present disclosure will be described below with reference to the drawings. The following exemplary embodiments are not intended to limit the disclosure set forth in the claims, and all combinations of features described in the exemplary embodiments are not necessarily essential to the solving means of the disclosure.

Figure 1:
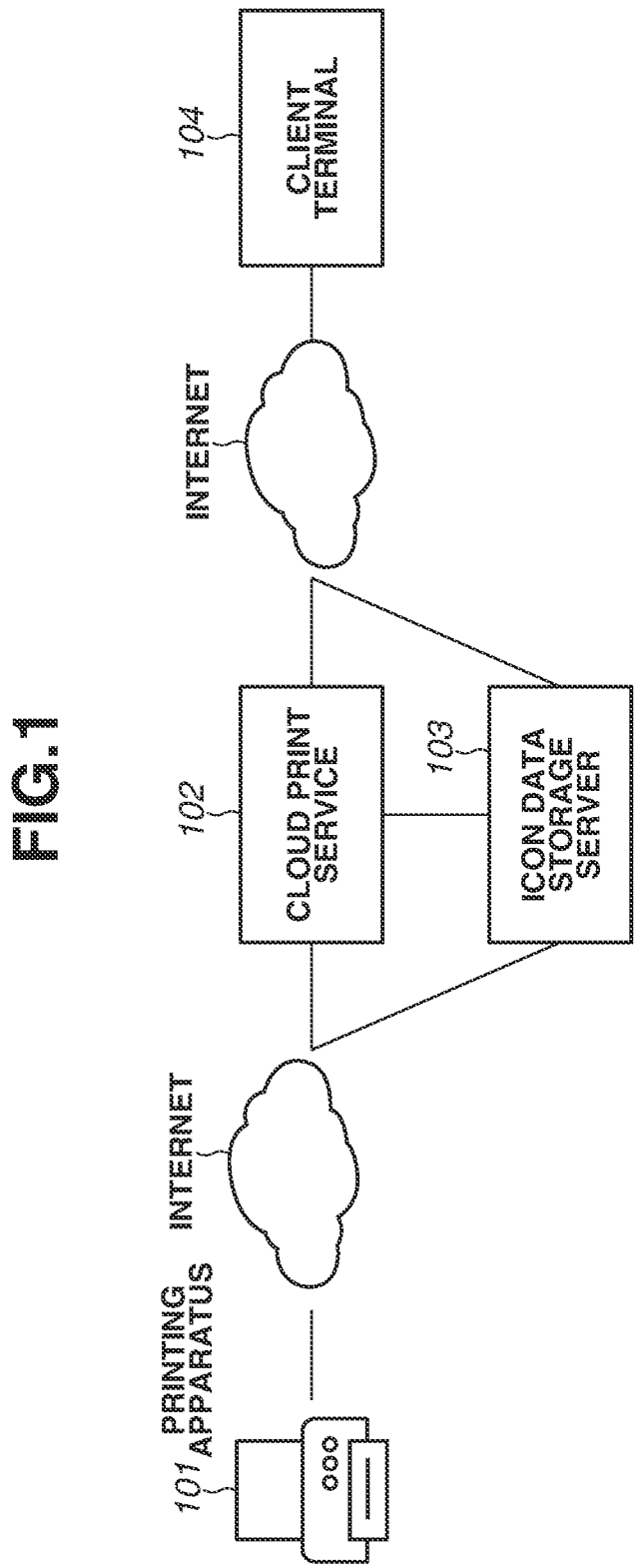
FIG. 1 is a diagram illustrating an example of a printing system.

A configuration of a printing system according to a first exemplary embodiment of the present disclosure will be described with reference to FIG. 1.

The printing system according to the present exemplary embodiment includes a printing apparatus 101, a client terminal 104, a cloud print service (CPS; hereinafter, may be referred to as a print service) 102, and an icon data storage server 103. The printing apparatus 101 communicates with the CPS 102 and the icon data storage server 103 on the Internet via a network. The network may be constituted by combining a communication network such as a local area network (LAN) and a wide area network (WAN), a cellular network (such as Long-Term Evolution [LTE] and fifth-generation [5G]), and/or a wireless network compliant with the Institute of Electrical and Electronics Engineers (IEEE) 802.11. In other words, the network may be any network capable of data transmission and reception, and may employ any physical layer communication method. The client terminal 104 also communicates with the CPS 102 and the icon data storage server 103 on the Internet via a communication network and/or a cellular network. The CPS 102 and the icon data storage server 103 also communicate via a network.

The printing apparatus 101 has a scan function of transmitting data based on an image read and obtained using a scanner to outside, a print function of printing an image on a sheet such as a sheet of paper based on a print job received from an external apparatus, and a copy function. The printing apparatus 101 can also receive a print job via the CPS 102 and print the print job. In the present exemplary embodiment, a multifunction peripheral (MFP) having a plurality of functions is described as an example of the printing apparatus 101. However, this is not restrictive. For example, a single-function peripheral (SFP) having only a single print function may be used. Moreover, in the present exemplary embodiment, printing on a sheet such as a sheet of paper is described as an example. However, this is not restrictive, and the present exemplary embodiment can also be applied to print control of three-dimensional (3D) printing where a 3D object is formed based on 3D shape data.

The printing apparatus 101 according to the present exemplary embodiment also has a user management function. If the user management function is enabled as an operation setting of the printing apparatus 101, the user performs authentication on the printing apparatus 101, logs in to the printing apparatus 101, and uses various functions of the printing apparatus 101 (details will be described below). The printing apparatus 101 also has a reservation printing function intended to prevent take-away by a third party and misprints. The reservation printing function refers to a function where the printing apparatus 101 temporarily stores a received print job in its storage instead of triggering printing upon the reception of the print job. If the reservation printing function is enabled, the printing apparatus 101 prints a user's print job after the user logs in successfully.

The CPS 102 accepts a print instruction from a client terminal such as the client terminal 104, receives a print job, and stores the print job. The CPS 102 then notifies the printing apparatus 101 registered in the CPS 102 of the submission of the print job. The notified printing apparatus 101 acquires the print job and temporarily stores the print job in its storage. The print job stored in the printing apparatus 101 is printed in response to acceptance of an instruction to start printing after the user logs in to the printing apparatus 101.

The icon data storage server 103 stores icon image data (hereinafter, may be referred to simply as an icon) expressing the appearance of the printing apparatus 101. The icon to be stored is provided for the icon data storage server 103 by the printing apparatus 101. Storing the icon, the icon data storage server 103 provides the printing apparatus 101 with Uniform Resource Locator (URL) information that is a storage path for providing the icon. The client terminal 104 can acquire the icon image data based on the URL information (details will be described below). In the present exemplary embodiment, the CPS 102 and the icon data storage server 103 are described as separate servers. However, the present disclosure is not limited thereto, and the effects of the present exemplary embodiment can be obtained with a single server configuration having both the server functions.

The CPS 102 and the icon data storage server 103 are illustrated to be constituted by a single server each. However, in the light of cloud service deployment, the CPS 102 and the icon data storage server 103 do not necessarily need to be constituted by a single server and can be implemented as a system including a plurality of devices.

<Hardware Configuration of Printing Apparatus 101>

Figure 4:
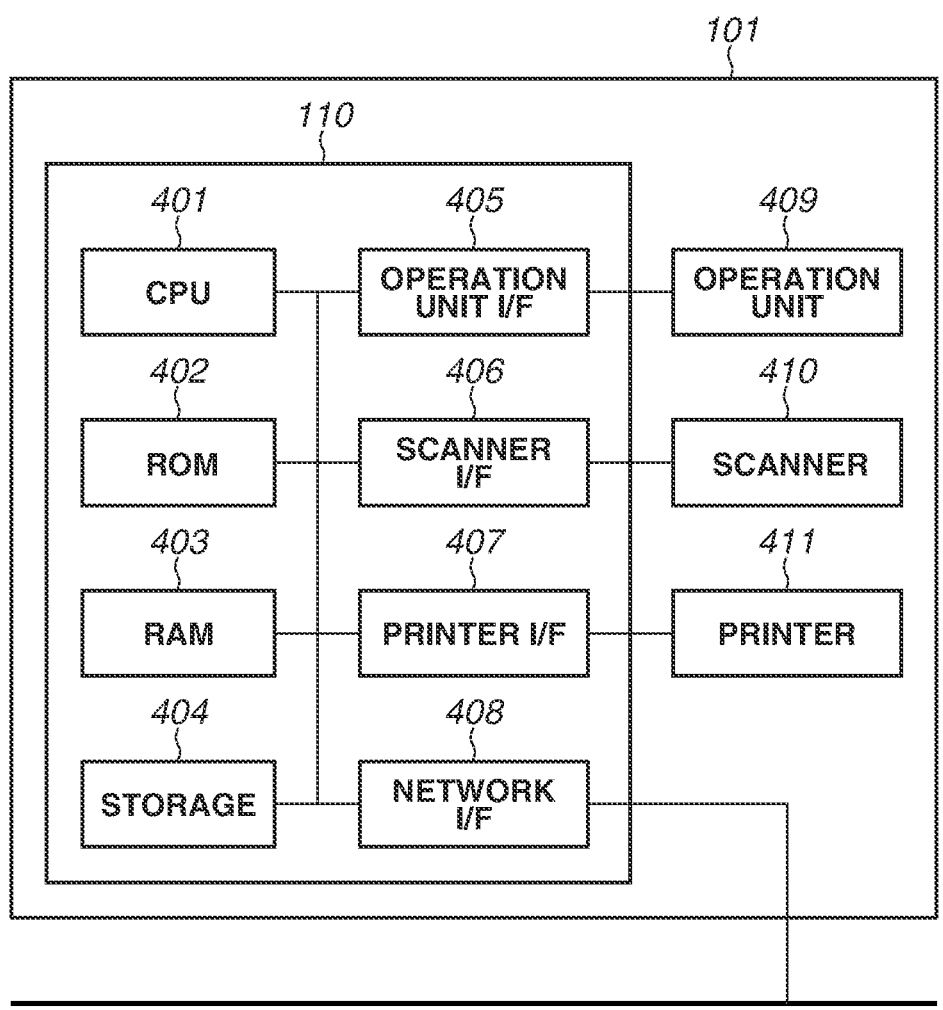
FIG. 4 is a diagram illustrating an example of a hardware configuration of the printing apparatus.

A hardware configuration of the printing apparatus 101 according to the present exemplary embodiment will be described with reference to FIG. 4. FIG. 4 is a block diagram illustrating the hardware configuration of the printing apparatus 101. The printing apparatus 101 has a reading function of reading an image on a sheet and a file transmission function capable of transmitting the read image to an external communication apparatus. The printing apparatus 101 also has a print function of printing an image on a sheet. The printing apparatus 101 also has a function of receiving a print job from the CPS 102 and printing the print job.

A control unit 110 including a central processing unit (CPU) 401 controls the operation of the entire printing apparatus 101. The CPU 401 reads control programs stored in a read-only memory (ROM) 402 or a storage 404, and performs various types of control including print control and read control. The ROM 402 stores control programs executable by the CPU 401. A random access memory (RAM) 403 is a main storage memory for the CPU 401 to access, and used as a work area or a temporary storage area for loading various control programs. The storage 404 stores print jobs, image data, various programs, and various types of setting information. The pieces of hardware such as the CPU 401, the ROM 402, the RAM 403, and the storage 404 thus constitute a computer.

In the printing apparatus 101 according to the present exemplary embodiment, one CPU 401 performs various processes illustrated in flowcharts to be described below using one memory (RAM 403). However, other configurations may be employed. For example, a plurality of processors, memories, and storages may cooperate to perform the processes illustrated in the flowcharts to be described below. Some of the processes may be performed using a hardware circuit.

A printer interface (I/F) 407 connects a printer 411 (printer engine) and the control unit 110. The printing apparatus 101 generates a print image and a print control command to be transmitted to the printer 411 based on a print job. The printer 411 prints an image on a sheet fed from a not-illustrated sheet feed cassette based on the print image and the print control command input via the printer I/F 407. The printing method may be electrophotographic printing where toner is transferred and fixed to paper, or inkjet printing where ink is discharged to paper for printing.

A scanner I/F 406 connects a scanner 410 and the control unit 110. The scanner 410 reads a document placed on a not-illustrated document positioning plate and generates image data. The image data generated by the scanner 410 is printed by the printer 411, stored into the storage 404, or transmitted to an external apparatus via a network I/F 408.

An operation unit I/F 405 connects an operation unit 409 and the control unit 110. The operation unit 409 includes a liquid crystal display unit having a touchscreen function, and various hardware keys. The operation unit 409 functions as a display unit for displaying information to the user and an acceptance unit for accepting user instructions. The CPU 401 performs information display control and user operation acceptance control in cooperation with the operation unit 409.

A network I/F 408 is connected with a network cable, and can communicate with external devices on the network and the Internet. In the present exemplary embodiment, the network I/F 408 is assumed to be a communication I/F for performing wired communication compliant with the Ethernet (registered trademark). However, this is not restrictive. For example, the network I/F 408 may be a wireless communication I/F compliant with the IEEE 802.11 series. Both may be wireless communication I/Fs. Alternatively, the network I/F 408 may be a communication I/F for performing mobile communications using a third-generation (3G) line such as code-division multiple access (CDMA), a fourth-generation (4G) line such as LTE, or 5G New Radio (NR).

<Hardware Configuration of CPS 102, Icon Data Storage Server 103, and Client Terminal 104>

Figure 18:
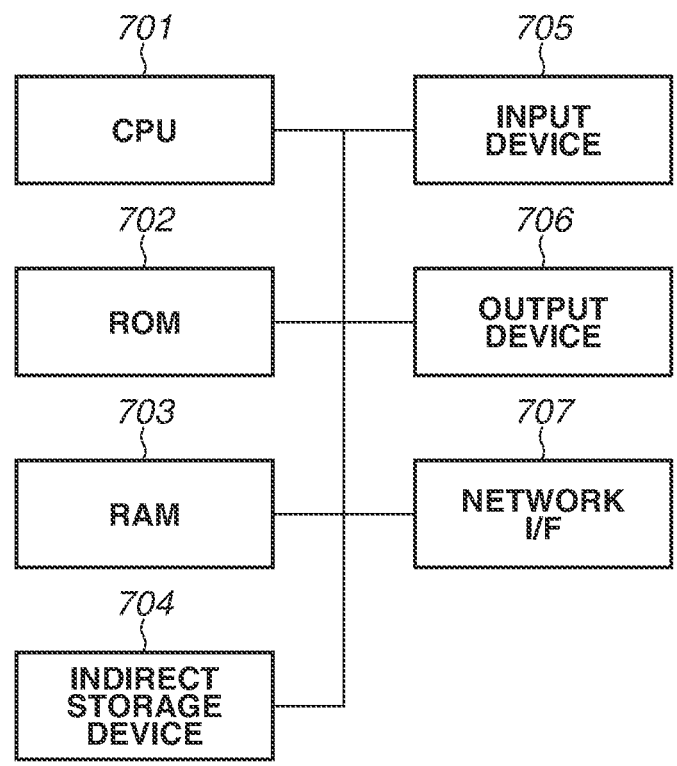
FIG. 18 is a diagram illustrating an example of a hardware configuration of servers and a client terminal.

FIG. 18 is a block diagram illustrating an outline of a hardware configuration of the CPS 102, the icon data storage server 103, and the client terminal 104. In FIG. 18, a CPU 701 directly or indirectly controls devices (such as a ROM and a RAM) connected by an internal bus, and executes programs for implementing the present exemplary embodiment. A ROM 702 stores Basic Input/Output System (BIOS). A RAM (direct storage device) 703 is used as a work area and a temporary storage area of the CPU 701. An indirect storage device 704 is a hard disk drive (HDD) or solid-state drive (SSD) storing an operating system (OS), or basic software, as well as applications and software modules. Examples of an input device 705 include a keyboard and a pointing device. An output device 706 is a display, for example.

A network I/F 707 is an I/F for connecting to a network. Like the network I/F 408 described with reference to FIG. 4, the network I/F 707 may be configured as a communication I/F other than for Ethernet connection.

<Registration of Printer and Use of Icon>

Next, a sequence related to the registration of an icon according to the present exemplary embodiment will be described with reference to FIG. 2. Packets which are transmitted in the sequence and of which no specific example is given here will be described in detail below with reference to other drawings.

To use the CPS 102 according to the present exemplary embodiment, the printing apparatus 101 initially registers itself in the CPS 102. The user operates the operation unit 409 of the printing apparatus 101 to make a CPS registration operation (not illustrated). In step S201, the printing apparatus 101 connects to the CPS 102 to register, and transmits a registration request packet to request registration. In step S202, the CPS 102 completes registration and transmits a registration response packet to return a registration response. FIGS. 6A and 6B illustrate examples of the Internet Printing Protocol (IPP) packets transmitted in steps S201 and S202.

FIG. 6A illustrates a registration request packet, which is transmitted with operation information for requesting registration "Operation: Register-Output-Device Request" and attribute information included. For example, "Requested-attributes: manufacturer information 'manufacture="Cannon"' and model information 'model="iR-ADV"'" are included as the attribute information.

FIG. 6B illustrates a registration response packet, which includes operation information "Operation: Register-Output-Device Response" and status information "Status code: successful-ok". The registration response packet further includes identification information 'Attribute: Cloud-device-id="0cc23168-d681-49b4-bc22-ef704a024aff"' as attribute information, for example. The CPS 102 issues the identification information about the registered device and transmits the identification information as the attribute information. By such processing, the printing apparatus 101 is registered in the CPS 102 as a CPS-capable device.

In step S203, the printing apparatus 101 transmits a capability acquisition request packet to the CPS 102 to inquire capability information currently registered in the CPS 102. In step S204, the CPS 102 transmits a capability acquisition response packet that is the capability information currently registered in the CPS 102 to the printing apparatus 101 as a response to the request of step S203. By the processing for inquiring of the capability information in steps S203 and S204, the printing apparatus 101 can acquire URL information about the server capable of storing icons from the CPS 102. In response to the capability acquisition request, the CPS 102 issues the URL information for storing the icon corresponding to the printing apparatus 101. In the present exemplary embodiment, the printing apparatus 101 acquires the URL information by issuing the capability acquisition request. However, the printing apparatus 101 may acquire the URL information by issuing a request other than the capability acquisition request. Moreover, the storage information about the server capable of storing icons is not limited to a URL, and any information from which the storage location can be identified may be used.

In step S205, the printing apparatus 101 transmits an image data upload request packet to the icon data storage server 103 based on the information acquired in step S204, thereby requesting update of icon image data. In step S206, the icon data storage server 103 returns the resulting icon storage status in response to the request from the printing apparatus 101, using an image data upload response packet.

In step S207, the printing apparatus 101 transmits a capability notification request packet to the CPS 102, thereby requesting update of the capability information about the own apparatus, including the URL information about the icon. In step S208, the CPS 102 transmits a capability notification response packet as a response to the capability notification request from the printing apparatus 101. If the sequence so far operates normally, the icon of the printing apparatus 101 is stored in the icon data storage server 103 and the URL information about the icon is registered in the CPS 102 as the capability information about the printing apparatus 101. A plurality of printing apparatuses can be registered in the CPS 102, and information about the plurality of printing apparatuses is registered in the CPS 102 by the series of processes from step S201 to step S208.

In step S209, the client terminal 104 transmits a capability acquisition request packet to the CPS 102 to acquire capability information about registered printing apparatuses. As a response, in step S210, the CPS 102 transmits the capability information about the printing apparatus 101, including the URL information about the icon, using a capability acquisition response packet.

FIGS. 10A and 10B illustrate examples of the IPP packets transmitted in steps S209 and S210. FIG. 10A illustrates the capability acquisition request packet that the client terminal 104 transmits to the CPS 102 in step S209, by which a request is issued using operation information "Operation: Get-Printer-Attributes Request". The capability acquisition request packet transmitted further includes printer icon information "printer-icons" as request attribute information.

FIG. 10B illustrates an example of the capability acquisition response packet that the CPS 102 transmits in step S210:
Attribute:
printer-icons="https://print.microsoft.com/static-resource/0cc23168-d681-49b4-bc22-ef704a024aff/Printer-icon.png"

The next step S211 is performed if the client terminal 104 receives the capability acquisition response packet of FIG. 10B in step S210 and thereby acquires image data storage path information. In step S211, the client terminal 104 accesses the icon data storage server 103 based on the URL information about the icon of the printing apparatus 101, acquired in step S210, and requests the icon using an image data acquisition request packet. In step S212, the icon data storage server 103 transmits icon image data to the client terminal 104 as a response, using an image data acquisition response packet.

FIGS. 11A and 11B illustrate examples of the packets transmitted and received between the client terminal 104 and the icon data storage server 103 in steps S211 and S212. FIG. 11A illustrates the image data acquisition request packet that the client terminal 104 transmits to request the icon of the printing apparatus 101, using a Hypertext Transfer Protocol (HTTP) GET operation. The capability information about the printing apparatus 101, acquired in step S210 is used as a parameter of the GET operation:

Protocol: HTTP
GET/Printer-icon.png HTTP/1.1
Host: https://print.microsoft.com/static-resource/0cc23168-d681-49b4-bc22-ef704a024aff As an HTTP response, the icon data storage server 103 transmits the image data acquisition response packet of FIG. 11B with electronic image data on the icon included. By the series of processes, the client terminal 104 acquires the icon image data on the printing apparatus 101. The client terminal 104 stores the icon image data in the RAM 703 or the indirect storage device 704 of the own apparatus. The OS and applications of the client terminal 104 can use the icon for identifying the printing apparatus 101.

Figure 3:
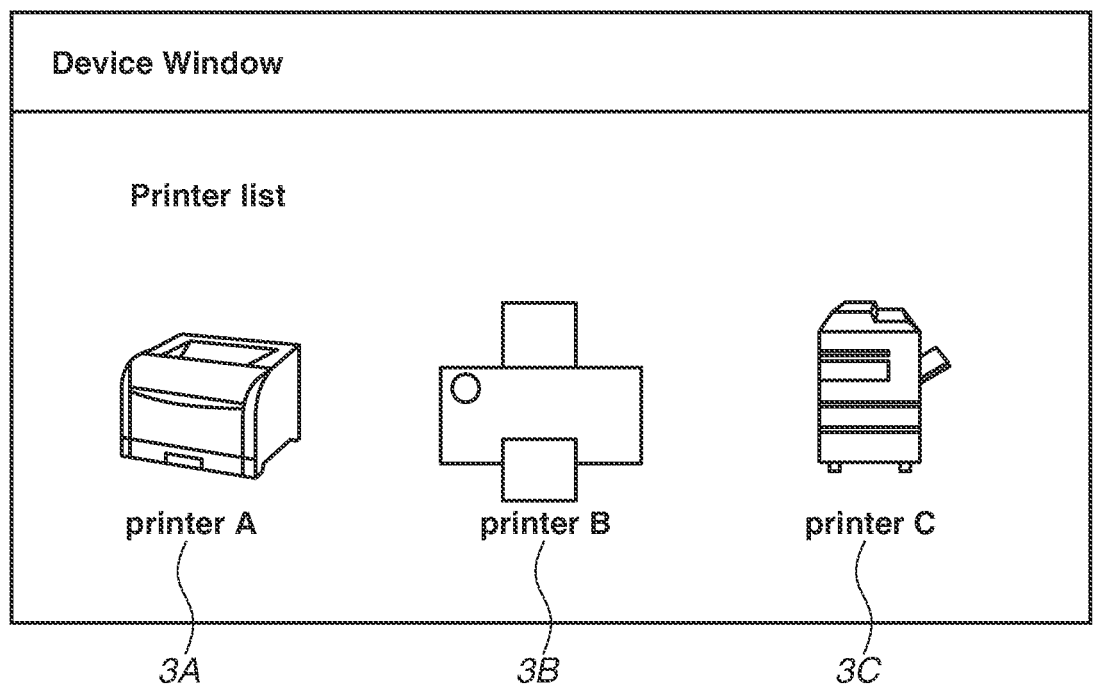
FIG. 3 illustrates an example of an operation screen of a client terminal having acquired icon image data.

FIG. 3 is a diagram illustrating an example of a printing apparatus selection screen of a print application running on the client terminal 104. The user who uses the client terminal 104 activates the print application to perform printing. The print application lists usable printing apparatuses on the printing apparatus selection screen of FIG. 3 along with their icon images 3A, 3B, and 3C to have the user select a usable printing apparatus. The printing apparatuses usable by the print application may include ones supporting Web Services for Devices (WSD) and local printing apparatuses directly connected to the client terminal 104, aside from the CPS 102.

The OS of the client terminal 104 searches for printing apparatuses supporting protocols such as WSD aside from the CPS 102, and acquires information about the devices detected by the search. For example, if the printing apparatuses represented by the icon images 3A and 3C are devices supporting the CPS 102, the print application displays the icon images 3A and 3C using the icon image data acquired in the foregoing step S212. If, for example, the printing apparatus represented by the icon image 3B is one detected by the WSD protocol and its icon is not included in the information about the device, the print application displays a general-purpose printing apparatus icon prepared by the OS.

As described above, the print application displays the icons of the printing apparatuses supporting the CPS 102. This enables the user to recognize differences in the appearances of the printing apparatuses to be used and easily identify the printing apparatuses. The icons of the printing apparatuses supporting the CPS 102 can also be used in the registration processing of printing apparatuses to be used by the OS and the print application of the client terminal 104. Displaying the icons on the registration screen of the OS facilitates the user to identify the printing apparatus to be registered from the icons.

<Icon Registration Processing>

Next, the control of the printing apparatus 101 up to updating the icon of the printing apparatus 101, with respect to the CPS 102, described in steps S203 to S208 of the sequence diagram of FIG. 2 will be described with reference to the flowchart of FIG. 5. In addition, specific examples of the packets communicated in the detailed description of the control will be described in detail with reference to FIGS. 7A, 7B, 8A, 8B, and 9A to 9C.

Figure 2:
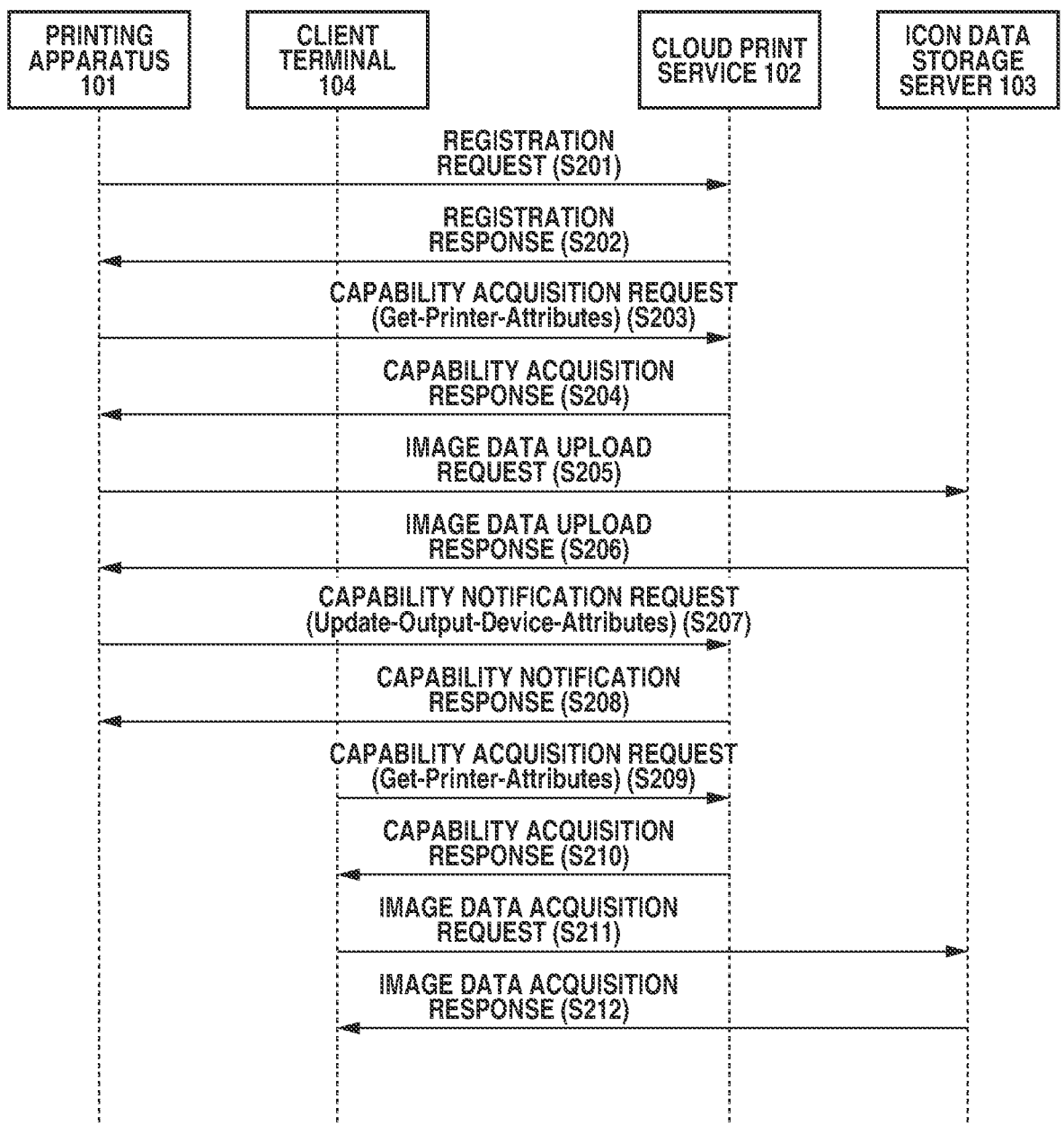
FIG. 2 is an example of a sequence diagram for describing transmission of icon image data of a printing apparatus.

The printing apparatus 101 completes registration in the CPS 102 by the processing of steps S201 and S202 in FIG. 2, and starts processing for registering the icon in its capability information. This icon registration processing is not limited to the timing of the registration processing on the CPS 102. The effects of the present exemplary embodiment can also be obtained if the icon registration processing is performed when the printing apparatus 101 is powered on or at a point in time when the communication path with the CPS 102 is established, for example.

With the icon registration processing started, then in step S501, the printing apparatus 101 transmits a capability acquisition request packet to the CPS 102. In step S502, the printing apparatus 101 receives a capability acquisition response packet transmitted from the CPS 102. FIGS. 7A and 7B illustrate examples of the IPP packets transmitted and received in the processing of steps S501 and S502. FIG. 7A illustrates the capability acquisition request packet transmitted by the printing apparatus 101. Operation information "Operation: Get-Printer-Attributes Request" and attribute information are thereby transmitted. The capability acquisition request packet includes a request for the URL information for storing of the icon, "Requested-attributes: printer-static-resource-directory-uri", as the attribute information. FIG. 7B illustrates an example of the capability acquisition response packet that the CPS 102 transmits to the printing apparatus 101. The capability acquisition response packet includes a status code indicating success, "Status code: successful-ok", and attribute information in addition to operation information "Operation: Get-Printer-Attributes Response". The attribute information includes storage path information that is URL information for storing of resources:

Attribute:
printer-static-resource-directory-uri="https://print.microsoft.com/static-resource/0cc23168-d681-49b4-bc22-ef704a024aff"

If, in step S502, the status code indicating success is received, the processing proceeds to step S503.

In steps S503 and S504, the processing of steps S205 and S206 described with reference to FIG. 2 is performed. In step S503, the printing apparatus 101 connects to the icon data storage server 103 and issues an image data upload request based on the storage path information included in the attribute information of the capability acquisition response packet received in step S502. In step S504, the printing apparatus 101 receives a response to the upload request from the icon data storage server 103.

FIGS. 8A and 8B illustrates examples of HTTP packets transmitted and received between the printing apparatus 101 and the icon data storage server 103 in steps S503 and S504. FIG. 8A illustrates the image data upload request packet that the printing apparatus 101 transmits to the icon data storage server 103. The printing apparatus 101 requests update of the icon by using an HTTP PUT operation:

Protocol: HTTP
PUT/Printer-icon.png HTTP/1.1
Host: https://print.microsoft.com/static-resourse/0cc23168-d681-49b4-bc22-ef704a024aff
Content-type: png
Content-length: 100
<Image Data>
(actual image data to be transmitted is appended here)

As described above, the image data upload request packet includes name information and format information about the icon, and the actual image data. The icon data storage server 103 responds to the printing apparatus 101 as to whether the image data update request is successful, which depends on the apparatus settings and states, using an image data upload response packet.

FIG. 8B illustrates an example of the image data upload response packet in a case where the icon is successfully updated. The stored information is returned along with an HTTP success response:
Protocol: HTTP
HTTP/1.1 201 Created
Content-Location:/Printer-icon.png Next, the printing apparatus 101 issues a notification to update its own capability information stored in the CPS 102 with the capability information about the icon image data stored in the icon data storage server 103. In step S505, the printing apparatus 101 includes the image data storage path information into the attribute information to be notified. The processing proceeds to step S506. In step S506, the printing apparatus 101 updates the capability information in the CPS 102 using a capability notification request packet. The processing proceeds to step S507. In step S507, the printing apparatus 101 receives a capability notification response packet from the CPS 102. The icon registration processing ends.

FIGS. 9A to 9C illustrate examples of the IPP packets transmitted and received in steps S506 and S507.

FIG. 9A illustrates the capability notification request packet in a case where the printing apparatus 101 includes the image data storage path information into the attribute information in step S506. This capability notification request packet includes the image data storage path about the location where the icon image data is stored as requesting attribute information:

Operation: Update-Output-Device-Attributes Request
Requested-attributes:
*snip*
printer-icons="https://print.microsoft.com/static-resourse/0cc23168-d681-49b4-bc22-ef704a024aff/Printer-icon.png"

FIG. 9B illustrates the capability notification response packet that the printing apparatus 101 receives from the CPS 102. The capability notification response packet includes a status code indicating success in addition to operation information "Operation: Update-Output-Device-Attributes Response".

In such a manner, the icon image data registration processing is completed.

The print application on the client terminal 104 thereafter can display the icon of the CPS-capable printing apparatus 101 as described in the section of the icon use by the client terminal 104.

Unnecessary upload of the same icon image data is desirably avoided. In this regard, a processing procedure when the printing apparatus 101 is powered on next time will be described with reference to FIG. 12.

While the following operation is described to be performed upon "power-on" of the printing apparatus 101, a similar procedure may be performed if the printing apparatus 101 has an on/off setting for using the print service in cooperation with the CPS 102 and the cloud print setting of the printing apparatus 101 is switched from off to on. In other words, the processing procedure of FIG. 12 is performed upon power-on or when the on/off setting of the printing apparatus 101 to use the print service of the CPS 102 is switched.

FIG. 12 is a flowchart related to activation processing upon power-on of the printing apparatus 101 and illustrates processing of icon image data.

In step S1201, the printing apparatus 101 detects power-on. In step S1202, the printing apparatus 101 checks for an upload history of icon image data to the icon data storage server 103. As described above, the procedure may be triggered to start by the switching of the on/off setting for the printing apparatus 101 to use the print service of the CPS 102.

The upload history refers to information about whether icon image data is uploaded to the icon data storage server 103, stored in the RAM 403 when step S1210 to be described below is performed and/or when the printing apparatus 101 receives the image data upload response packet of FIG. 8B. This information includes at least information about a file or files of icon image data of the printing apparatus 101 uploaded so far.

FIGS. 13A and 13B illustrate examples of the upload history of the icon image data. FIG. 13A illustrates an example where a file is uploaded. FIG. 13B illustrates an example where a plurality of files is uploaded. FIG. 13B illustrates that different pieces of icon image data are uploaded on the assumption that the icon image data to be displayed on the client terminal 104 varies depending on the usage of the print service by the client terminal 104.

While FIGS. 13A and 13B illustrate examples of the upload history of the icon image data, upload date and time information and upload number of times information may be stored and managed in addition to the file information.

If there is an upload history of icon image data (YES in step S1202), the processing proceeds to step S1211 to be described below.

If, in step S1202, there is no upload history of icon image data to the icon data storage server 103 (NO in step S1202), the processing proceeds to step S1206. In step S1206, the printing apparatus 101 performs processing similar to that of step S501. In step S1207, the printing apparatus 101 performs processing similar to that of step S502. The printing apparatus 101 thereby checks the connection destination at the icon data storage server 103 from the CPS 102. In step S1208, the printing apparatus 101 performs processing similar to that of step S503. In step S1209, the printing apparatus 101 performs processing similar to that of step S504. The printing apparatus 101 thereby uploads new icon image data to the icon data storage server 103. In step S1210, the printing apparatus 101 stores information about the upload history to the icon data storage server 103 into the RAM 403.

In step S1211, if the icon image data is determined to have been uploaded from the information about the upload history (YES in step S1211), the processing proceeds to step S1203. In step S1203, the printing apparatus 101 adds the image data storage path information in registering the icon image data the last time as attribute information. In step S1204, the printing apparatus 101 performs processing similar to that of step S506. In step S1205, the printing apparatus 101 performs processing similar to that of step S507. The printing apparatus 101 thereby notifies the CPS 102 of the information about the icon image data.

As described with reference to FIG. 9A, the printing apparatus 101 generates a capability notification request packet by adding the printer-icons attribute, which is an example of specification of the storage path of the icon image data to other capability attributes and performs information notification, using IPP communication.

If, in step S1211, the icon image data is not determined to have been uploaded from the information about the upload history (NO in step S1211), the processing proceeds to step S1204. In step S1204, as illustrated in FIG. 9C, the printing apparatus 101 generates a capability notification request packet not including the printer-icons attribute and performs information notification. This prevents the upload of the icon image data to the icon data storage server 103 described in steps S203, S204, S205, and S206 from being performed each time the printing apparatus 101 is powered on.

In such a manner, efficient icon image data upload processing is performed by transmitting icon image data to the icon data storage server 103 only when the icon image data is desirably uploaded upon power-on of the printing apparatus 101, and an unnecessary delay in the activation time of the printing apparatus 101 is avoided. In the first exemplary embodiment, the event to store the icon image data is described to occur when the printing apparatus 101 is first powered on after the completion of the registration in the CPS 102. If the upload has been completed by the power-on timing, the event to store the icon image data does not occur. If, for example, the upload has ended with an error, the processing for storing the icon image data is performed at the power-on timing.

Figure 14:
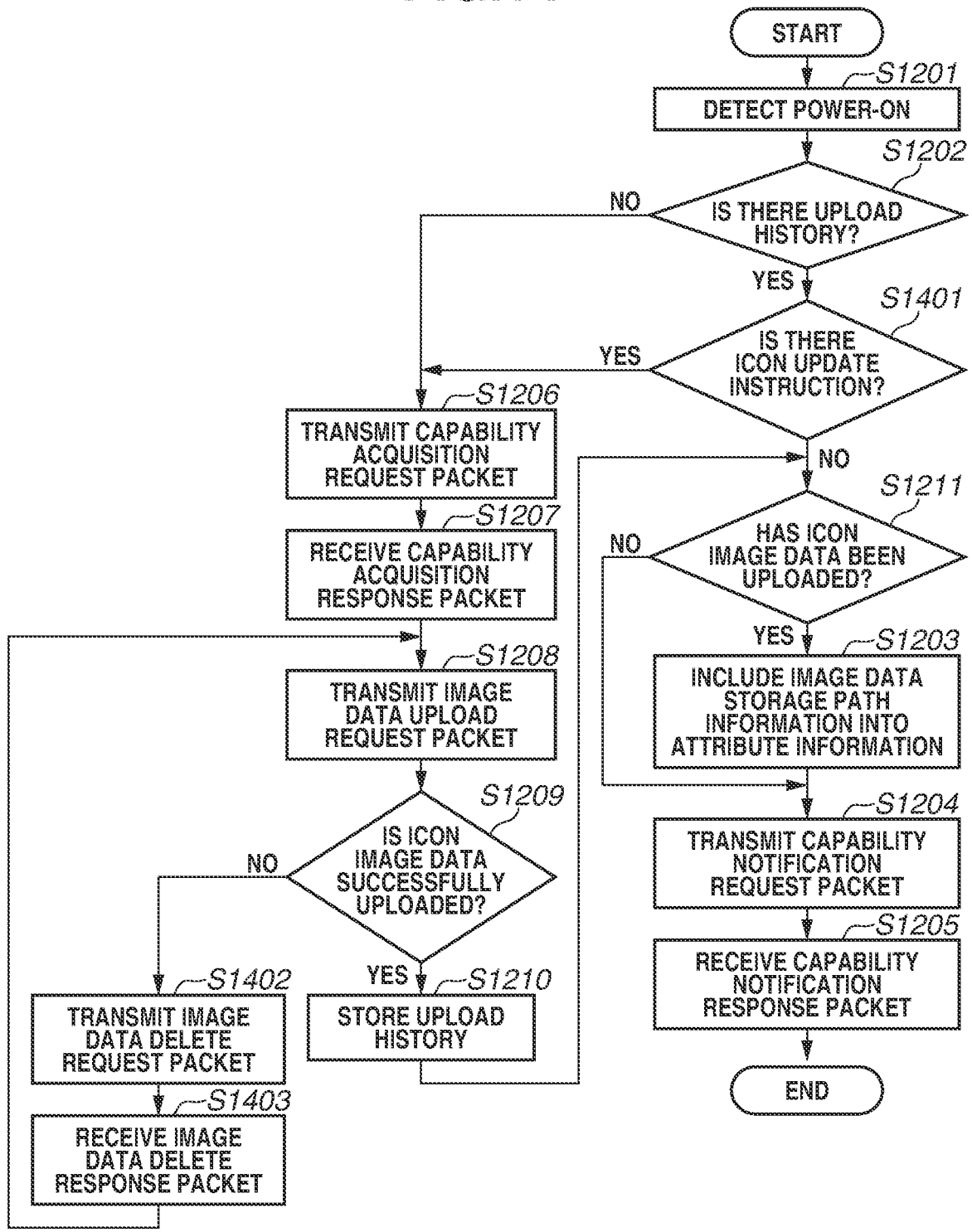
FIG. 14 is a flowchart illustrating an example of control of a printing apparatus according to a second exemplary embodiment.
Figure 16:
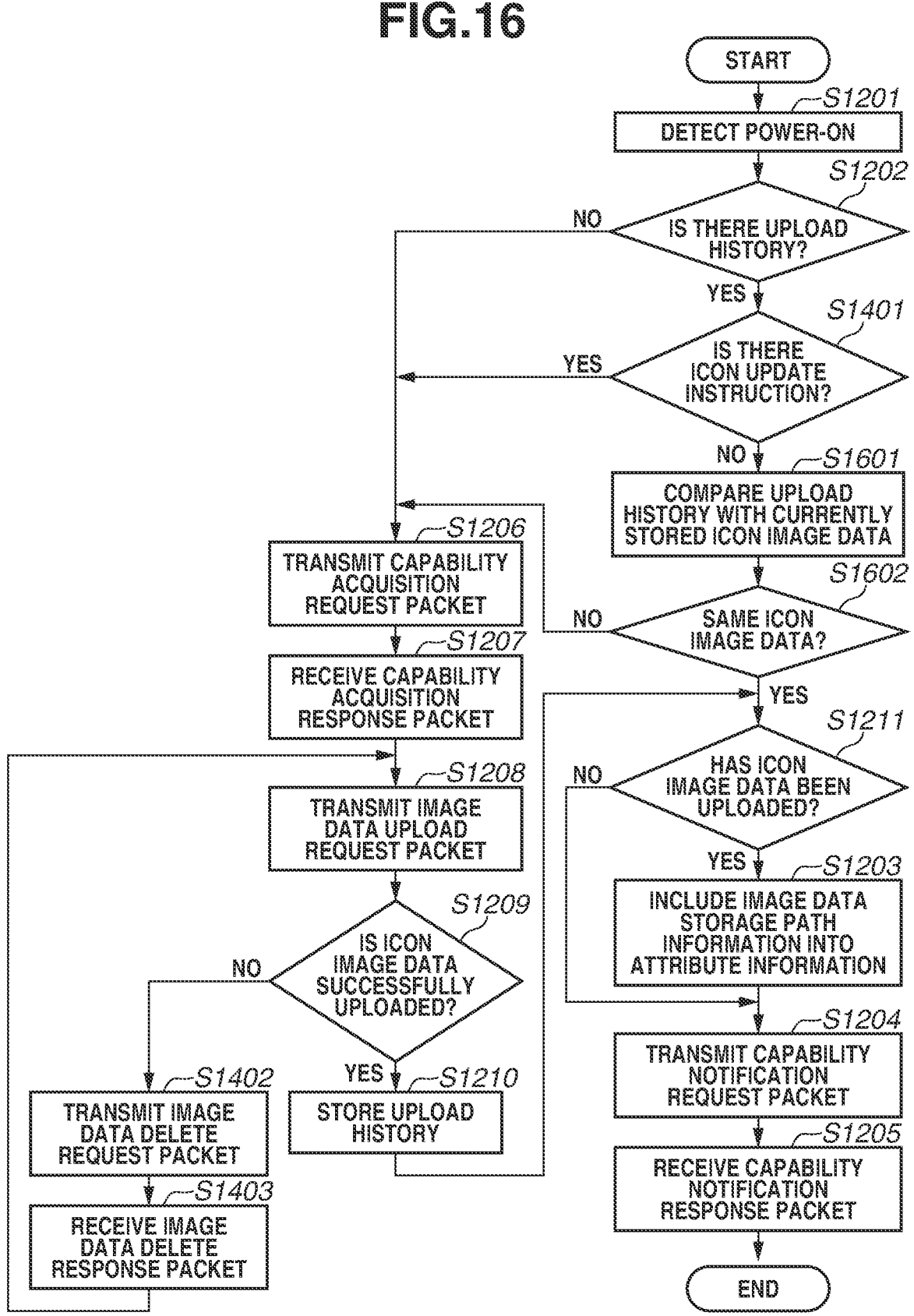
FIG. 16 is an operation flowchart of a printing apparatus according to a third exemplary embodiment.

A second exemplary embodiment will be described with focus on differences from the first exemplary embodiment. A description of similarities will be omitted. In the second exemplary embodiment, icon image data is uploaded to the icon data storage server 103 based on an event to store the icon image data by manual update, in addition to the first exemplary embodiment. FIG. 14 illustrates processing including an additional procedure different from the procedure of the first exemplary embodiment. In step S1401, the printing apparatus 101 checks whether there is an instruction to update the icon image data from the user. If there is such an instruction (YES in step S1401), the processing proceeds to step S1206. If not (NO in step S1401), the processing proceeds to step S1211.

FIGS. 17A and 17B are diagrams illustrating a user I/F for accepting the instruction to update the icon image data from the user of the printing apparatus 101.

The printing apparatus 101 can display the user I/F on the input device 705 and accept the instruction to update the icon image data from the user.

FIG. 17A illustrates a setting screen displaying various settings for the printing apparatus 101 to operate the CPS 102. If the printer registration is completed using the name displayed in the printer name field in the setting screen, the printer registration status changes to "registered" and the CPS 102 becomes operable.

The setting screen includes an icon update button 1701 for updating the icon image data. If the icon update button 1701 is pressed, the printing apparatus 101 displays a screen illustrated in FIG. 17B. In the example of FIG. 17B, the printing apparatus 101 is illustrated to have three types of icon image data 1702, 1703, and 1704. However, the number of pieces of icon image data stored may be one or more than one, and the stored icon image data can be displayed.

In step S1401, the printing apparatus 101 can check whether there is an icon update instruction (instruction to update the icon image data) based on the user's selection input of the icon image data and whether an event of pressing an update start button 1705 occurs.

In step S1209, the printing apparatus 101 determines whether the update is successful. If the update fails (NO in step in step S1209), the processing proceeds to step S1402. In step S1402, the printing apparatus 101 transmits an image data delete request packet illustrated in FIG. 15A to the icon data storage server 103.

In step S1403, the icon data storage server 103 receiving the image data delete request packet deletes the intended icon image data instructed by the printing apparatus 101, and responds with the result.

FIGS. 15A and 15B illustrate examples of the packets communicated between the printing apparatus 101 and the icon data storage server 103 during the processing for deletion of the icon image data.

FIG. 15A illustrates an example of the image data delete request packet transmitted to the icon data storage server 103.

In this example, an HTTP DELETE operation is used to specify the storage path of the icon image data to be deleted:
Protocol: HTTP
DELETE/Printer-icon.png HTTP/1.1
Host: https://print.microsoft.com/static-resource/0cc23168-d681-49b4-bc22-ef704a024aff FIG. 15B illustrates an example of an image data delete response packet indicating the result of the icon data storage server 103 receiving the image data delete request packet of FIG. 15A and deleting the intended icon image data.

This example indicates that the icon image data is deleted as a result of the HTTP DELETE operation:
Protocol: HTTP
HTTP/1.1 200 OK The printing apparatus 101 receives the image data delete response packet from the icon data storage server 103, and performs the processing of step S1208 and the subsequent steps while retrying the upload processing of the icon image data if needed.

As described above, if the icon image data is desirably updated with new data, the upload processing can be performed based on a manual instruction issued by the user of the printing apparatus 101 regardless of whether the icon image data has been uploaded. If the upload fails because of the icon data storage server 103, the printing apparatus 101 can determine that the same icon image data as in the previous communication is desirably uploaded again.

A third exemplary embodiment will be described with focus on differences from the first and second exemplary embodiments. A description of similarities will be omitted. In the third exemplary embodiment, icon image data is uploaded to an icon data storage server 103 based on an event to store the icon image data by automatic update, in addition to the first and second exemplary embodiments.

If, in the foregoing step S1202, there is an upload history indicating that icon image data has been uploaded at least once (YES in step S1202) and, in step S1401, there is no manual icon update instruction (NO in step S1401), the processing proceeds to step S1601. In step S1601, the printing apparatus 101 can automatically update the icon image data.

More specifically, the printing apparatus 101 compares the upload history of step S1210 with the currently stored icon image data, and if the icon image data uploaded before and the currently stored icon image data are different, automatically updates the icon image data.

The comparison between the upload history of step S1210 and the currently stored icon image data will be described. For example, in step S1210, the printing apparatus 101 calculates a hash value for each piece of icon image data using a typical hash algorithm (such as Secure Hash Algorithm [SHA]-1, SHA-256, and Message Digest Method 5 [MD5]). The generated hash value (hash value of several tens of bytes or so for each piece of icon image data) is stored as an upload history. In the icon image data comparison processing of step S1601, the printing apparatus 101 derives a hash value of the currently stored icon image data by calculation similar to that of the update history. The printing apparatus 101 can determine whether the icon image data uploaded before and the currently stored icon image data are the same by comparing the hash value stored as the upload history and the hash value of the currently stored icon image data.

Whether the two pieces of icon image data are the same can thus be checked by comparing several tens of bytes of hash values. Alternatively, the actual icon image data itself uploaded before may be stored as the upload history in step S1210, and compared with the currently stored icon image data in step S1601.

In step S1602, if the two pieces of icon image data are determined to be different (NO in step S1602), the processing proceeds to step S1206.

If the two pieces of icon image data are determined to be the same (YES in step S1602), the processing proceeds to step S1211.

As described above, the printing apparatus 101 can automatically determine a difference in the icon image data, and issue a notification only if the pieces of icon image data are different. This precludes unnecessary upload of icon image data, and prevents an adverse effect on the network or the printing apparatus 101.

Other Exemplary Embodiments

An exemplary embodiment of the present disclosure can also be implemented by processing for supplying a program for implementing one or more functions of the foregoing exemplary embodiments to a system or an apparatus via a network or a storage medium, and reading and executing the program by one or more processors in a computer of the system or apparatus. Circuits that implement one or more functions (such as an application-specific integrated circuit [ASIC] and a field-programmable gate array [FPGA]) may be used for implementation.

Unnecessary transmission processing of icon image data already uploaded to an icon data storage server can be prevented.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-019680, filed Feb. 13, 2023, which is hereby incorporated by reference herein in its entirety.

What is claimed is:

1. A printing apparatus configured to communicate with a print service via an Internet, the print service being configured to register the printing apparatus based on acceptance of a registration request for the printing apparatus and provide the printing apparatus with a print job based on acceptance of a print instruction for the registered printing apparatus, the printing apparatus comprising:
at least one processor; and
at least one memory in communication with the at least one processor having instructions stored thereon, when executed by the at least one processor, configured to function as:
a reception unit configured to receive storage information for storing icon image data on the printing apparatus from the print service;
a storage unit configured to store the icon image data on the printing apparatus based on the storage information; and
a notification unit configured to, in a case where the print service is notified of capability information about the printing apparatus, notify the print service of the capability information with path information about the stored icon image data on the printing apparatus included,
wherein in a case where an event to store the icon image data occurs, the storage information is received and the icon image data on the printing apparatus is stored, and then the notification unit notifies the print service of the capability information with the path information about the stored icon image data on the printing apparatus included.

2. The printing apparatus according to claim 1, wherein in a case where the notification unit issues a notification in absence of the event to store the icon image data, the storage information is not received nor is stored the icon image data on the printing apparatus, and the notification unit notifies the print service of the capability information with the path information on the stored icon image data on the printing apparatus included.

3. The printing apparatus according to claim 1, wherein the event to store the icon image data is an event occurring in a case where power-on of the printing apparatus is detected.

4. The printing apparatus according to claim 1, wherein the event to store the icon image data is an event caused by a user's instruction to update the icon image data.

5. The printing apparatus according to claim 1, wherein the event to store the icon image data is an event occurring from a change in a configuration of the printing apparatus or a change in the capability information.

6. The printing apparatus according to claim 1, wherein Internet Printing Protocol (IPP) is used to make notification of the capability information about the printing apparatus by the notification unit and to receive the print job.

7. The printing apparatus according to claim 1, wherein the storage information is requested by transmitting a capability notification request packet of the printing apparatus after the printing apparatus is registered.

8. The printing apparatus according to claim 1, wherein the capability information about the printing apparatus notified by the notification unit is information provided for a print application of a client terminal configured to transmit the print instruction to the printing apparatus, and the print application displays a printing apparatus selection screen based on the provided information.

9. A control method of a printing apparatus configured to communicate with a print service via an Internet, the print service being configured to register the printing apparatus based on acceptance of a registration request for the printing apparatus and provide the printing apparatus with a print job based on acceptance of a print instruction for the registered printing apparatus, the control method comprising:
receiving storage information for storing icon image data on the printing apparatus from the print service;
storing the icon image data on the printing apparatus based on the storage information; and
in a case where the print service is notified of capability information about the printing apparatus, notifying the print service of the capability information with path information about the stored icon image data on the printing apparatus included,
wherein in a case where an event to store the icon image data occurs, the storage information is received and the icon image data on the printing apparatus is stored, and then the notifying notifies the print service of the capability information with the path information about the stored icon image data on the printing apparatus included.

10. A non-transitory computer-readable storage medium storing a program for causing a printing apparatus to perform a control method of the printing apparatus configured to communicate with a print service via an Internet, the print service being configured to register the printing apparatus based on acceptance of a registration request for the printing apparatus and provide the printing apparatus with a print job based on acceptance of a print instruction for the registered printing apparatus, the control method comprising:
receiving storage information for storing icon image data on the printing apparatus from the print service;
storing the icon image data on the printing apparatus based on the storage information; and
in a case where the print service is notified of capability information about the printing apparatus, notifying the print service of the capability information with path information about the stored icon image data on the printing apparatus included,
wherein in a case where an event to store the icon image data occurs, the storage information is received and the icon image data on the printing apparatus is stored, and then the notifying notifies the print service of the capability information with the path information about the stored icon image data on the printing apparatus included.

\* \* \* \* \*